(12) United States Patent
Rivlin (10) Patent No.: US 9,127,779 B2
(45) Date of Patent: Sep. 8, 2015

(54) LOW POWER ELECTRIC OPERATED THERMOSTATIC MIXING VALVE

(76) Inventor: Eitan Rivlin, Givat Zeev (IL)

( * ) Notice: Subject to any disclaimer, the term of this patent is extended or adjusted under 35 U.S.C. 154(b) by 1421 days.

(21) Appl. No.: 12/745,898

(22) PCT Filed: Dec. 1, 2008

(86) PCT No.: PCT/IB2008/055019
§ 371 (c)(1),
(2), (4) Date: Jun. 3, 2010

(87) PCT Pub. No.: WO2009/072049
PCT Pub. Date: Jun. 11, 2009

(65) Prior Publication Data
US 2010/0276500 A1    Nov. 4, 2010

(30) Foreign Application Priority Data
Dec. 6, 2007    (IL) .......................................... 187922

(51) Int. Cl.
| G05D 23/185 | (2006.01) |
| F16K 31/04 | (2006.01) |
| G05D 23/13 | (2006.01) |
| F01P 7/14 | (2006.01) |

(52) U.S. Cl.
CPC .......... F16K 31/047 (2013.01); G05D 23/1393 (2013.01); *F01P 2007/146* (2013.01)

(58) Field of Classification Search
CPC ............ G05D 23/1393; G05D 23/136; G05D 23/1346; G05D 23/1353; G05D 23/134; F16K 31/047; F16K 11/24; F16K 11/0078; F16K 17/00; F16K 11/0787; F16K 11/0655; F16K 11/065; F16K 11/044; F16K 31/0627; F15B 13/04; F15B 13/0422
USPC ................. 236/12.11–12.22; 137/337, 625.4, 137/625.48, 625.5, 636.1
See application file for complete search history.

(56) References Cited

U.S. PATENT DOCUMENTS

| 1,819,045 | A | * | 8/1931 | Snediker ..................... 236/12.11 |
| 3,036,777 | A | * | 5/1962 | Budde ........................... 236/12.2 |
| 4,711,392 | A | * | 12/1987 | Kidouchi et al. .......... 236/12.12 |
| 5,033,671 | A | * | 7/1991 | Shiba et al. ................ 236/12.12 |
| 5,400,961 | A | * | 3/1995 | Tsutsui et al. ............. 236/12.12 |
| 6,444,127 | B1 | * | 9/2002 | Vaughan et al. .............. 210/662 |

* cited by examiner

*Primary Examiner* — Frantz Jules
*Assistant Examiner* — Azim Abdur Rahim
(74) *Attorney, Agent, or Firm* — Edward Langer Adv. & Patent Attorney (57) ABSTRACT

A frictionless, pressure balanced proportioning valve assembly, for low power electric operated thermostatic cartridge, composed of a housing with spaced apart hot and cold water inlets and intermediate mixed water outlet, flow communicated to a spool bore with a central widened portion; a spool, guided in the spool bore, by widened end portions, is carrying a central widened disk portion, separating the spool bore into two tubular inlet chambers; two diaphragm seals disposed at both ends of the spool and housing, pressure balancing the inlet chambers; a temperature sensor, exposed to the mixed water outlet pathway, generates a signal, readable by a control circuit; a drive unit energized by a low power electric motor, driving past gear train and eccentric shaft, a bendable connecting rod, axially displacing the spool. Axial displacement of the balanced friction-free spool, proportions flow from the hot and cold water inlets to the mixed water outlet.

27 Claims, 12 Drawing Sheets

LOW POWER ELECTRIC OPERATED THERMOSTATIC MIXING VALVE

FIELD OF THE INVENTION

The present invention relates to thermostatic mixing valves and, more specifically, to frictionless pressure balanced proportioning valve and drive system, targeted for fast settling, low power consuming, electric operated thermostatic mixing valves.

BACKGROUND OF THE INVENTION

Thermostatic mixing valves are known and their use is greatly spreading in developed countries mainly due to regulations enforcing, at least one central thermostatic mixing valve, in new installations. However, cost reduction, as well as recognition of the convenience and safety involved, contributes to increasing market share of thermostatic mixing valves in point of use installations such as individual basins, bathtubs and showers, as well.

Presently, most thermostatic mixing valves utilize a thermally responsive wax element directly coupled to a spring loaded proportioning valve. However, such directly driven thermostatic valves fail to provide a constant outlet water temperature, if the pressure or the temperature of the water in one of the supply lines, rises or drops, the temperature of the outlet water is temporarily changed. The temperature responsive wax element responds to the temperature change by forcing the proportioning valve in the direction that will tend to restore the mixed water temperature to its previous level, nevertheless, the previous level can not be reached as long as the supply line conditions are altered, and the system will settle in a new equilibrium position corresponding to a new outlet water temperature. This new outlet water temperature is not the preselected temperature since, due to its linear characteristic, any new position of the temperature responsive wax element, different from the initial position, is associated with a different mixed water temperature.

Consequently, a typical error of up to 2° C. from the initial setting, can be expected in wax element thermostatic valves, in the event of pressure or temperature fluctuations in one of the supply lines. Furthermore the response time of such wax filled elements is slow, typical temperature restore times after pressure fluctuation events are in the range of 1.5 seconds or above, such a delay may cause inconvenience to the user, as well as oscillations or hunting mostly apparent at low flow rates.

Another, in theory, more precise approach to control thermostatic mixing valves is to employ an electric amplified feedback device. Electric operated thermostatic mixing valves usually comprises hot and cold water inlets, a motor with speed reducing gear or lead screw, driving rotational or linear proportioning valve, a mixing chamber, a temperature sensor, an electronic comparator unit for comparing the temperature sensor reading with a reference signal, and a motor controller for keeping the signal differences as low as possible.

Examples of such electric powered thermostatic mixing valves can be found for instance in U.S. Pat. Nos. 4,359,186 4,420,811 4,931,938 5,944,255 and U.K. patent GB2056627A.

The described systems typically include sophisticated electronics, a microprocessor running some complex mathematical model, an amplifier stage suitable for driving at least 10 W motor, further requiring high output electrical power supply. Safety protection against electrical shock is needed, as well as protection against power loss to avoid the risk of losing control of the mixed water temperature.

In an attempt to detect the basic reasons for such complexity, two main deficiencies of the prior art were isolated:

a. Most of the disclosed inventions are using conventional proportioning valves fitted with an electric drive unit. These devices require significant force to overcome pressure imbalances, friction of a fluid-to-air seal and friction of internal proportioning valve fluid-to-fluid seals. This in turn requires large motors having high power consumption and high mechanical inertia, further requiring computing of dedicated acceleration and deceleration algorithms, large power supply, and in-wall installation extending to AC mains power.

b. Additionally, the conventional proportioning valves generally have large volume mixing chamber resulting in a delayed reading of the mixed water temperature by the temperature sensor, such delay makes it very difficult to effectively control the proportioning valve in different flow rates, since the time required for the hot and cold water to flow from the proportioning valve seats to the temperature sensor is considerably greater at low flow rates than during high flow rates, resulting in a too wide dispersion of the feedback system time constant. Some of the cited prior art are using two independent proportioning valves, having long pathways to the mixing chamber, and even longer time delay as described above.

A microprocessor loaded with complex computational model is aimed to overcome the time constant problem, by adjusting the steady state water temperature slowly and creating a high speed or momentary loop in case of disturbances in inlet water pressure or temperature, forming two distinct bands of operation, being the high speed or disturbance band and the set point or steady state band. However such solution requires additional sensors as well as computation resources requiring more power and space.

Consequently, although basic technology for electric operated mixing valves exists, a new approach for construction of the proportioning valve and its drive system is required.

SUMMARY OF THE INVENTION

It is therefore, an object of the present invention to provide a frictionless, pressure balanced proportioning valve assembly and drive unit, targeted for fast settling, low power consuming, electric operated thermostatic mixing valves.

According to one embodiment of the present invention, there is provided a frictionless pressure balanced proportioning valve assembly comprising:

a. A housing having a first water inlet, a second water inlet, intermediate mixed water outlet, a spool bore formed in said housing, being in flow communication with the first and second water inlets, the spool bore having generally central widened portion being in flow communication with the intermediate mixed water outlet.

b. A spool, guided in the spool bore, by a first and a second widened end portions, carrying a central widened disk portion, being axially shorter than the spool bore widened portion. The spool is loosely axially movable within the spool bore with the disk portion traveling in the spool bore widened portion between two opposing seats. The disk portion separating the spool bore into a first tubular water inlet chamber and a second tubular water inlet chamber.

c. Two seals disposed at both ends of the spool and housing, are configured, by effective area equalization, for pressure balancing of the first tubular water inlet chamber between a first seal and the disk portion, and pressure balancing of the second tubular water inlet chamber between a second seal and the disk portion.

d. A temperature sensor exposed to the mixed water outlet pathway, generating an electronic signal.

e. Attached drive means, energized by a low power electric motor, axially displacing said spool.

Axial displacement of the spool, proportions flow from the first and second water inlets to the mixed water outlet.

According to a second embodiment of the present invention, further optimized for cartridge applications, the housing is split into: a first cylindrical enclosure, having an outer circumferential recess water inlet, in flow communication with a first axial non-centric bore by at least one radial passage; and a second cylindrical enclosure, having outer circumferential recess water inlet in flow communication with a second axial non-centric bore by at least one radial passage.

According to a third embodiment, yet further optimized for facially seated cartridge applications, the housing is split into a first cylindrical enclosure and a second cylindrical enclosure, the first cylindrical enclosure is provided with a first facial axially oriented inlet directed to a radial passage being in flow communication with a first non-centric bore, and a second facial axially oriented inlet passing through the first cylindrical enclosure into succeeding axially oriented inlet of the second cylindrical enclosure, the succeeding axially oriented inlet, is directed to a radial passage being in flow communication with a second non-centric bore.

Common to the above second and third embodiments, the first and second cylindrical enclosures are facially mated with each other, aligned such that the first axial non-centric bore, and the second axial non-centric bore, are joining to a spool bore. The first and second cylindrical enclosures have towards their mating faces, an internal widened portion, forming a common, minimal volume, mixing chamber, the mixing chamber being discharged through a radial extension and directed into an axially oriented mixed water outlet pathway formed in the first cylindrical enclosure.

Common to the above first, second and third embodiments, the seals are constructed as elastic diaphragm seals with inner ring, outer ring and rolling type thin active portion, they are secured in grooves on the outer faces of the spool end widened portions, and in grooves on the outer faces of the housing. The diaphragm seals are tightened to the spool by washers, center bolt and nut, they are tightened to the housing by fastened first and second end disks.

Additionally, common to the above first, second and third embodiments, the electric motor has a pinion fixed to its shaft, driving past reduction gear train, a final drive gear, carrying a smaller circular eccentric extension, the final drive gear is centrally bored with close tolerances to freely rotate over a fixed pivot with minimal radial clearance. A connecting rod, having first attachable end, second circular end—bored to fit the eccentric extension, and intermediate thin bendable portion, is fitted with its second circular end over the circular eccentric extension, and secured with its first attachable end to the spool. Angular displacement of the final drive gear and circular eccentric extension, is translated into linear displacement of the connecting rod and spool, flexibility of the connecting rod bendable portion compensates for out of axis displacement of the circular eccentric extension during rotation.

According to a fourth embodiment of the present invention, optimized for self powering cartridge applications, an axial turbine is disposed in the outlet pathway, mounted on a shaft rotateably seated in a first and a second bearings, the first bearing is mounted in the center of a fixed insert constructed with radial fins to allow free flow of water between the fins, the second bearing is mounted in the second end disk. A permanent magnet rotor is mounted on a distal portion of the shaft, surrounded with stator coil, seated in a cylindrical space provided in the second cylindrical enclosure. The assembly of the rotor and the stator coil forms an AC generator, the entire volume is water tight sealed, and generated power is delivered to an electronic circuit through sealed wires.

BRIEF DESCRIPTION OF THE DRAWINGS

The present invention will be more fully understood and appreciated from the following detailed description taken in conjunction with the drawings, in which.

DETAILED DESCRIPTION OF THE INVENTION

Figure 1:
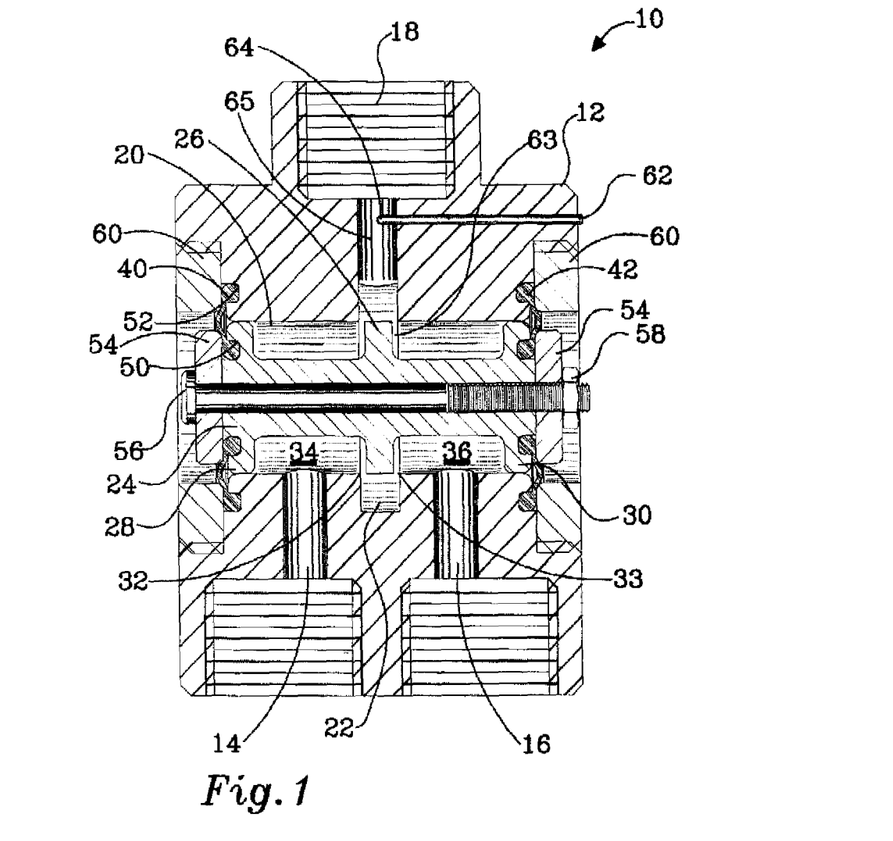
FIG. 1 illustrates a cross-sectional view of a frictionless, pressure balanced proportioning valve, in accordance with a first embodiment of the present invention.

Some preferred embodiments of the present invention will now be described in detail by way of an example. With reference to FIG. 1, related to a first simplified embodiment of the present invention, there is shown a frictionless, pressure balanced proportioning valve assembly generally referenced 10, composed of:

a. A housing 12 having first water inlet 14, second water inlet 16, intermediate mixed water outlet 18, a spool bore 20 formed in the housing, being in flow communication with the first and second water inlets 14,16, the spool bore having generally central widened portion 22 being in flow communication with the intermediate mixed water outlet 18.

b. A spool 24, guided in bore 20, by first and second widened end portions 28, 30, carrying a central widened disk portion 26, being axially shorter than the spool bore widened portion 22, the spool 24 is loosely axially movable within the spool bore 20 with the disk portion 26 traveling in the spool bore widened portion 22 between two opposing lands or seats 32, 33. The disk 26, separating, the spool bore 20 into first tubular water inlet chamber 34 and second tubular water inlet chamber 36.

c. Two elastic diaphragm seals 40, 42 disposed at both ends of said spool 24, and housing 12, are configured, by effective area equalization, for pressure balancing of said first tubular water inlet chamber 34 between first diaphragm seal 40 and disk 26 and pressure balancing of said second tubular water inlet chamber 36 between second diaphragm seal 42 and disk 26. The pressure balance technique, eliminates axial forces on spool 24 at any given equal or different hot and cold water inlet pressures.

Figure 2:
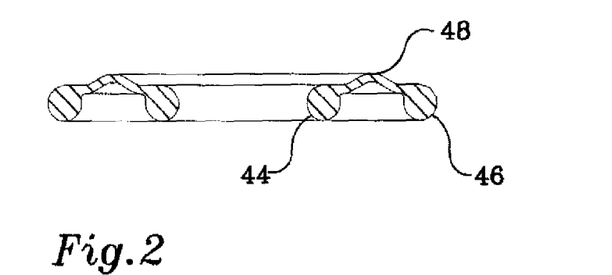
FIG. 2 illustrates, an enlarged cross-sectional view of a rolling diaphragm for the frictionless pressure balanced proportioning valve, in accordance with several embodiments of the present invention.
Figure 3:
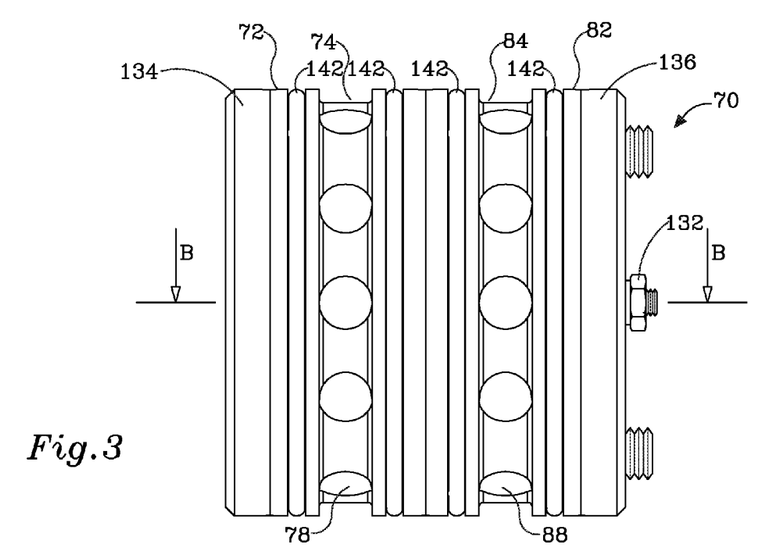
FIG. 3 illustrates an elevated top view of a frictionless, pressure balanced proportioning valve, in accordance with a second embodiment of the present invention.

The diaphragm seals, constructed with inner ring 44, outer ring 46 and preferably rolling thin active portion 48 (FIG. 2), are secured in grooves 50, 52 on the outer faces of spool 24, and housing 12, respectively. They are tightened to the spool 24 by washers 54 center bolt 56 and nut 58, and fastened to the housing by threaded end disks 60. Instead of the elastic diaphragm seals there may be used thin wall corrugated metal bellows such as known in the industry.

A temperature sensor 62 is inserted through a bore in housing 12, pressed, overmolded or bonded with a sealing agent, with its tip 64, exposed to a mixed water outlet pathway 65. The temperature sensor 62, preferably, but not necessarily, of the thermistor type, generates an electronic signal readable by a control circuit as will be hereinafter explained with reference to FIG. 20.

As can be easily understood now, hot and cold water, introduced into inlets 14 and 16 will flow into balanced, tubular, first and second water inlet chambers 34, 36, respectively, through the peripheral flow gap 63 located between the disk 26 and seats 32, 33 to the widened portion 22 serving as a mixing chamber, and then disposed via the mixed water outlet pathway 65 to mixed-water outlet 18. Any axial displacement of the spool 24 will alter the proportioning of hot and cold water and hence the temperature of the disposed mixed water. It will be also recognized by a person skilled in the art that minimal force is required for axial displacement of the spool 24 since the spool is perfectly pressure balanced, the elastic diaphragm seals 40, 42 incorporate an active portion of the thin rolling type, and no friction seals are involved at all.

The operation of the frictionless pressure balanced proportioning valve assembly will be explained in more detail with reference to FIGS. 3 to 7, related to a second embodiment of the present invention. Referring to the figures, there is shown a cartridge type, frictionless, pressure balanced proportioning valve assembly, generally referenced 70, composed of: first cylindrical enclosure 72, having an outer circumferential recess 74 water inlet, being in flow communication with first axial non-centric bore 76 (FIGS. 4, 5), by plurality of radial passages 78; second cylindrical enclosure 82, having an outer circumferential recess 84 water inlet, being in flow communication with second axial non-centric bore 86 (FIGS. 4, 7), by a plurality of radial passages 88.

Figure 4:
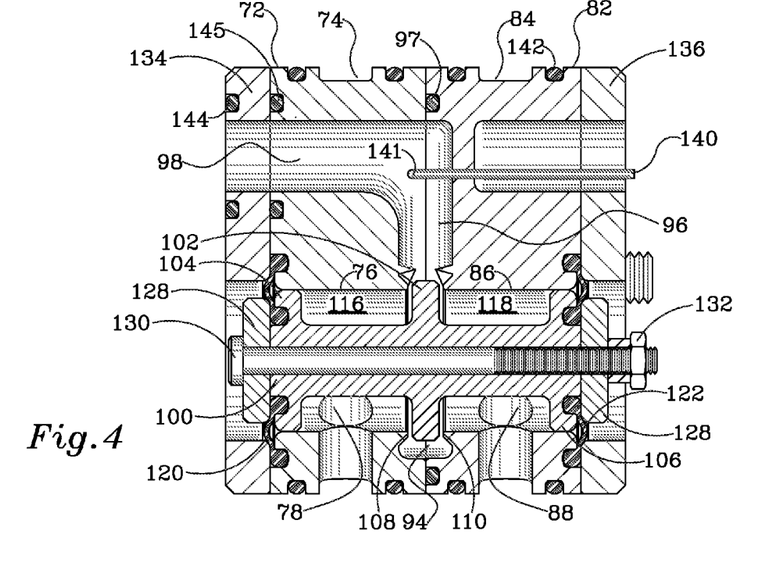
FIG. 4 illustrates a cross-sectional view of a frictionless, pressure balanced proportioning valve, taken along line B-B (FIG. 3)
Figure 5:
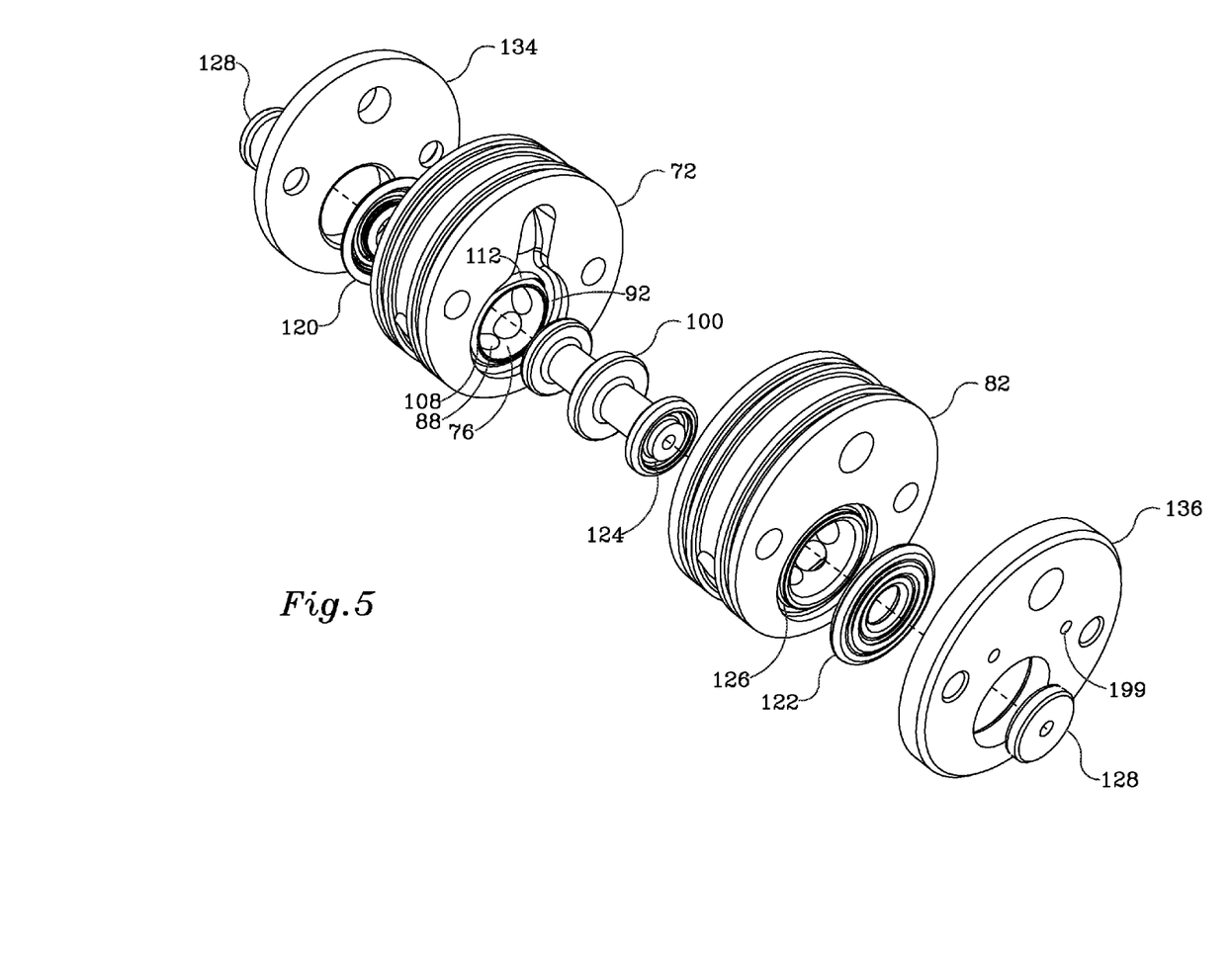
FIG. 5 illustrates an isometric exploded view of a frictionless, pressure balanced proportioning valve in accordance with the second embodiment of the present invention.
Figure 6:
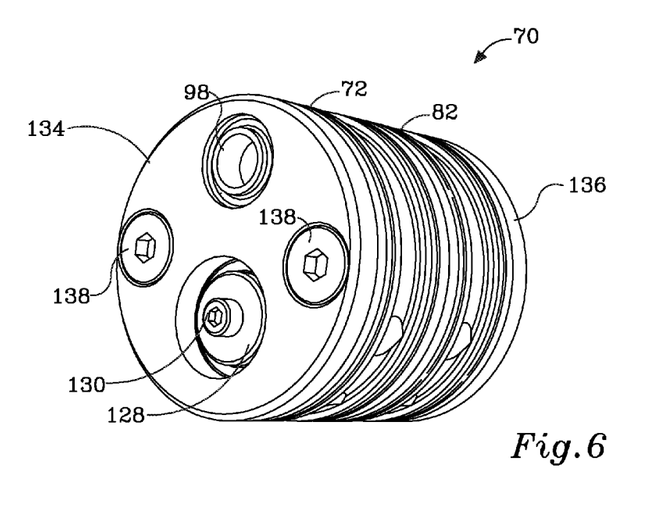
FIG. 6 illustrates a first end isometric view of the assembled frictionless, pressure balanced proportioning valve in accordance with the second embodiment of the present invention.
Figure 7:
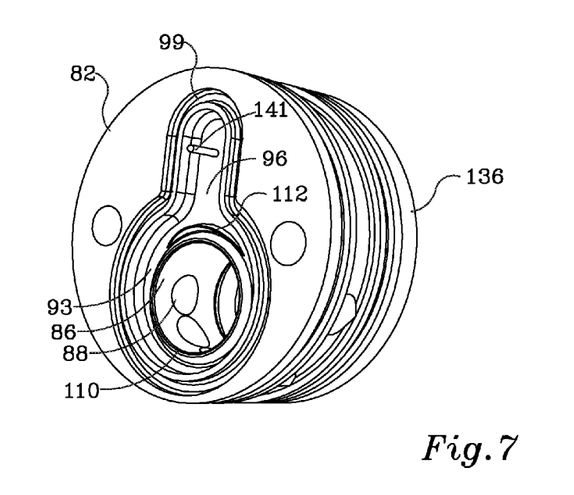
FIG. 7 illustrates the frictionless pressure balanced proportioning valve of FIG. 6, partially dismantled.

The first and second cylindrical enclosures 72,82, are facially mated with each other, aligned such that the first axial non-centric bore 76, and second axial non-centric bore 86, are joining to a spool bore. The first and second cylindrical enclosures 72,82, have towards their mating faces, an internal widened portion 92, 93, respectively (FIGS. 5, 7), forming, when both enclosures are mated with each other, a common, minimal volume, mixing chamber 94 (FIG. 4). The mixing chamber 94 being discharged through a radial extension 96 (FIG. 4) and directed into axially oriented mixed water outlet pathway 98 formed in first cylindrical enclosure 72. The mixing chamber 94, preferably having a dedicated contour, is not concentrically aligned with the axial non-centric bores 76, 86, rather, having its larger volume directed towards the outlet radial extension 96, the exact dedicated contour is optimized such that, at a given flow rate, the circumferential flow velocity towards the outlet is approximately constant, while the volume of the mixing chamber is kept minimal. The second cylindrical enclosure 82, is provided with elastomer seal 97 (FIG. 4), seated in groove 99 (FIG. 7), surrounding the widened diameter portion 93, and the radial extension 96. Upon mating of cylindrical enclosures 72, 82, with each other, mixed water may be discharged only through outlet pathway 98 (FIG. 6).

The frictionless, pressure balanced proportioning valve assembly 70, is further composed of a spool 100 carrying a central widened portion 102 serving as a two sided valve disk, first and second end widened portions 104, 106 are guiding the spool 100 in the non-centric bores 76, 86, of cylindrical enclosures 72, 82 respectively, however in contrast to the first described embodiment of the present invention, here the spool disk portion 102 is cross-sectionally wider than the non-centric bores 76, 86. The spool 100 is loosely axially movable between two extreme positions identified by either face of the two sided disk 102, closing against one of opposing first and second lip valve seats 108, 110, respectively (FIGS. 4, 5, 7) trimming the non-centric bores 76, 86. Flow deflectors 112 (FIGS. 5, 7), are provided in the flow path of the mixed water on both cylindrical enclosures 72, 82, in order to improve the mixing of hot and cold water prior to temperature measurement taken by the temperature sensor 140 (FIG. 4).

The cylindrical enclosures 72, 82, and spool 100, are preferably made of plastic material. Some benefits of the outlet pathway 98 axial orientation, besides of production simplicity in plastics, will be explained herein below with relation to the third and fourth embodiments of the present invention.

Principally, same elastic diaphragm seals 120,122, as described with reference to the first embodiment of the present invention are disposed at both ends of the spool 100, and cylindrical enclosures 72, 82. The diaphragm seals 120, 122 are configured, by equalization, of their effective area to the lip valve seats 108, 110 actual area, for pressure balancing of first inlet tubular chamber 116 between first diaphragm seal 120 and disk 102; and pressure balancing of second inlet tubular chamber 118 between second diaphragm seal 122 and disk 102. The diaphragm seals 120, 122, constructed with inner ring 44, outer ring 46 and preferably rolling thin active portion 48 (FIG. 2), are secured in grooves 124, 126, (FIG. 5), on the outer faces of spool 100, and of cylindrical enclosures 72, 82, respectively. The diaphragm seals 120, 122 are tightened to the spool 100 by washers 128, center bolt 130 and nut 132. The seals 120,122, are tightened to the first and second cylindrical enclosures 72, 82, by fastened, first and second preferably metal end disks 134, 136. Two longitudinally through running bolts 138 (FIG. 6) are tightening first and second end disks 134, 136, retaining the assembly 70. Instead of the elastic diaphragm seals, there may be used thin wall corrugated metal bellows as known in industry.

As with the first embodiment, a temperature sensor 140 is inserted through bore in second cylindrical enclosure 82, with its tip 141, exposed to the mixed water flow pathway. The temperature sensor, preferably but not necessarily of the thermistor type, is generating a signal readable by a control circuit as will be hereinafter described with reference to FIG. 20.

Figure 13:
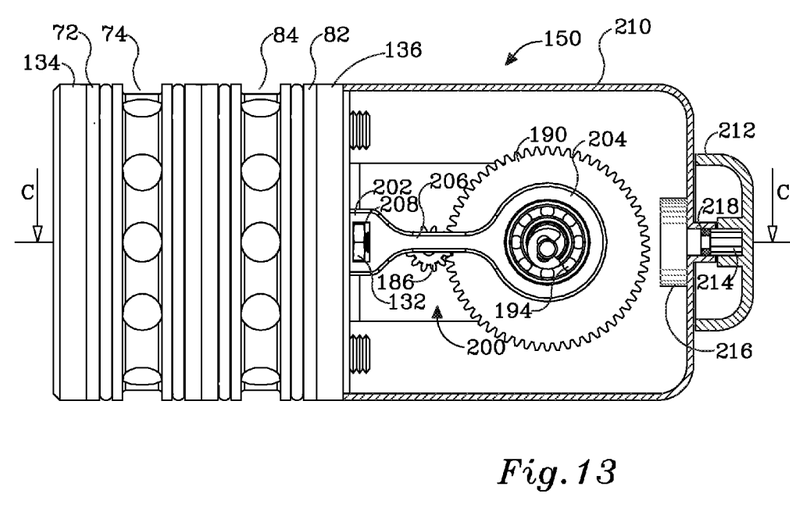
FIG. 13 illustrates a partially sectioned top view of the frictionless, pressure balanced proportioning valve, with drive unit and protective cover, in accordance with the second embodiment of the present invention.

Elastomer seals 97, and 145, are sealing between first and second cylindrical enclosures 72, 82 and between first end disk 134 to first cylindrical enclosure 72. The four peripheral and one face elastomer seals 142, 144 (FIG. 4), respectively, are separating between the two inlets, outlet and dry regions, while the frictionless pressure balanced proportioning valve assembly 70 is serving as a thermostatic cartridge in an appropriate housing, as will be explained hereinafter with reference to FIGS. 13, 14.

In operation, this second embodiment of the present invention is essentially similar to the first embodiment, however it will be recognized by the person skilled in the art that due to the dedicated contour, and off axis alignment of the mixing chamber 94 with relation to the valve seats 108, 110, the volume of water contained between the proportioning valve seats 108, 110, to the temperature sensor tip 141 (FIG. 4), is very small, practically in the range of below two cubic centimeters, yet, flow is not restricted and minimal pressure drop is involved. Additionally the temperature sensor tip 141, is located at closest position downstream the flow deflectors 112 (FIGS. 5, 7) wherein the flow is fastest, and the mixing is thorough. Consequently the time required for the hot and cold water to flow from the proportioning valve seats 108, 110, to the temperature sensor tip 141 is considerably reduced. For example, even at flow rates as small as two liters per minute the calculated time is in the range of 30 milliseconds. With such small values, the time constant deviation problem mentioned above with relation to prior art, is completely resolved.

As disclosed above it is an object of the present invention to provide drive means for efficiently actuating the spool of the frictionless pressure balanced proportioning valve. The operation of the drive means will be explained in more detail with reference to FIGS. 8 to 14, describing drive unit that is fitted to a frictionless pressure balanced proportioning valve assembly 70, as described above with relation to the second embodiment of the present invention. It will be understood however, that such drive means may perform equally well with relation to any other embodiment of the present invention.

Referring to the figures, there is shown the frictionless, pressure balanced proportioning valve assembly, generally referenced 70 (FIG. 12), equipped with drive unit generally referenced 150. The operation of the drive unit 150, will be explained by the order of assembly of its individual components.

As shown in the exploded view (FIG. 8), the drive unit is energized by a low power electric motor 162 having pinion 164 fixed to its shaft. The motor drives a final drive gear 190, past three stage spur wheel reduction gear, generally referenced 165. The reduction gear 165, includes first dual gear 166, freely rotating over second shaft 168; second dual gear 170 fixed to first shaft 172, and third single gear 174 fixed to second shaft 168. The shafts are rotateably mounted between baseplate 176 and cover plate 178. A precise diameter stepped pivot 180, preferably hardened and polished, is fitted through baseplate 176, sleeve 182, cover plate 178, and secured with nut 184. An external final pinion 186 is pressed or otherwise fixed to the second shaft 168. The final drive gear 190, carrying a smaller circular eccentric extension 192, preferably made in one piece, is centrally bored with close tolerances to freely rotate over the fixed pivot 180 with minimal radial clearance.

The assembled drive unit 150 (FIG. 9) is optionally fitted with a bearing, preferably, ball-bearing 194 (FIG. 10), pressed over the circular eccentric extension 192 of final drive gear 190, a circlip 196 is securing final drive gear 190, to pivot 180. The drive unit is attached to the frictionless pressure balanced proportioning valve assembly 70 by screws 198 (FIG. 11) secured into threaded holes 199 (FIG. 5), of the second end disk 136. A connecting rod generally referenced 200 (FIGS. 12, 13, 14), is provided with first flat attachable end 202, second circular end 204, bored to fit the eccentric extension 192 or bearing 194, and intermediate thin bendable portion 206. The connecting rod 200, made of semi-elastic material, preferably, glass reinforced plastic, is fitted with its second circular end 204 over bearing 194, and secured with its first flat attachable end 202 to spool 300 by bolt 130 (FIG. 11), and nut 132, inserted into a slot 208 (FIG. 13) of connecting rod 200.

Figure 8:
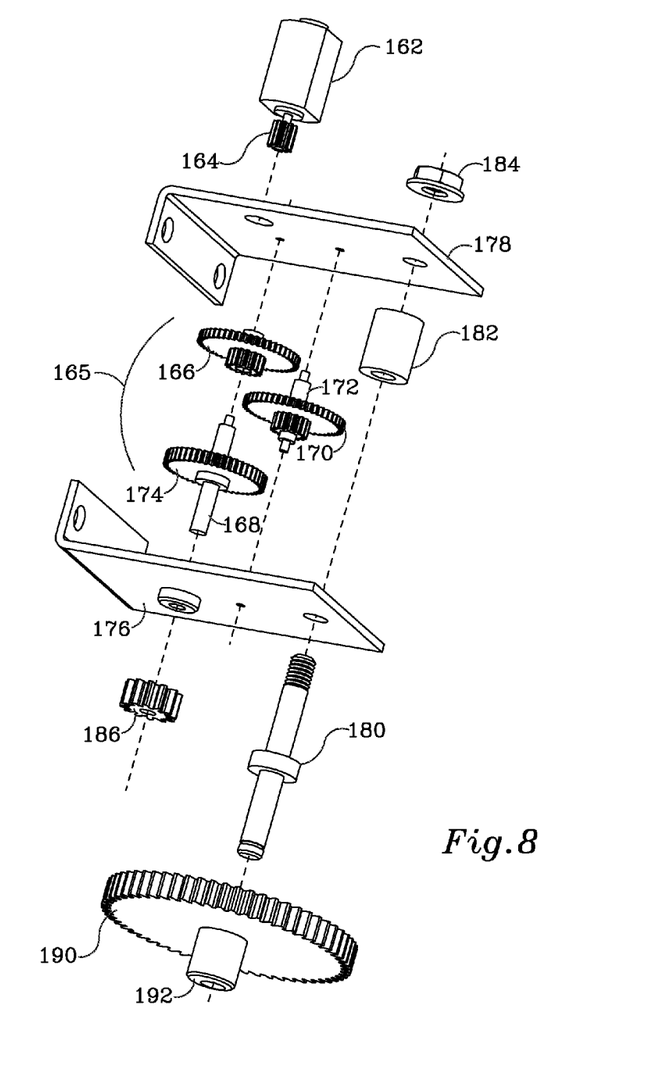
FIG. 8 illustrates an isometric exploded view of a drive unit, for the frictionless, pressure balanced proportioning valve, in accordance with several embodiments of the present invention.
Figure 9:
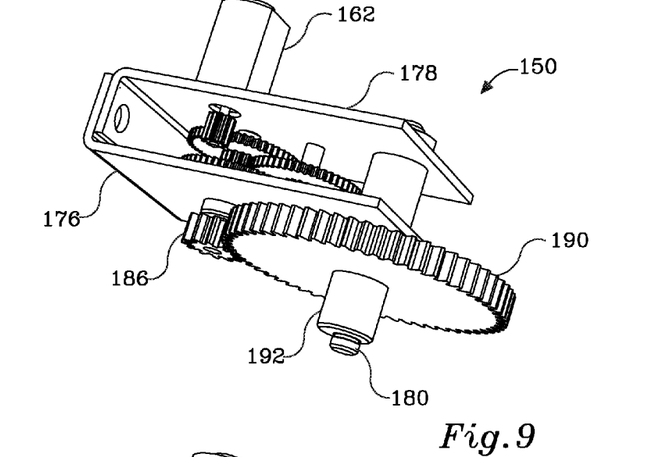
FIG. 9 illustrates an isometric view of the assembled drive unit shown exploded in FIG. 8.
Figure 10:
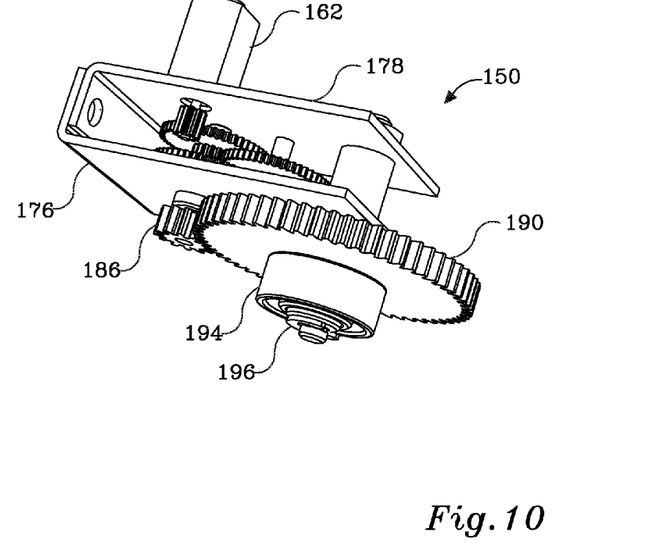
FIG. 10 illustrates an isometric view of the assembled drive unit of FIG. 9, showing an additional assembly step.
Figure 11:
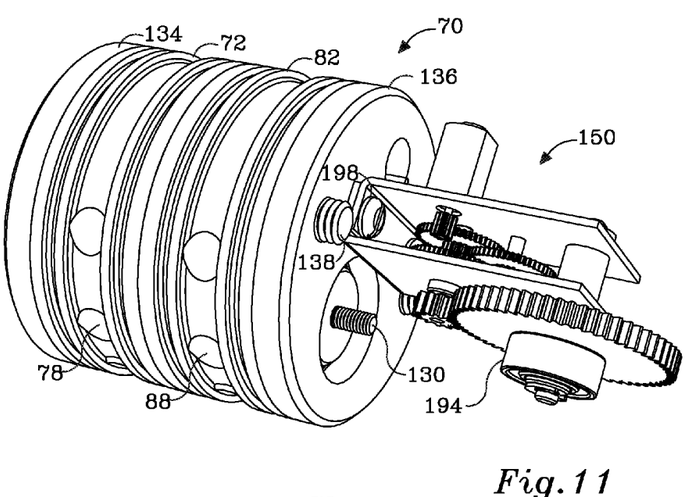
FIG. 11 illustrates an isometric view of the assembled drive unit of FIG. 10, mounted to the frictionless, pressure balanced proportioning valve, in accordance with the second embodiment of the present invention.

In operation, the drive pinion 186, is driving final drive gear 190, with its circular eccentric extension 192. The angular displacement of the eccentric extension 192, is translated through ball-bearing 194 into linear displacement of the connecting rod 200 and hence also spool 100.

Figure 12:
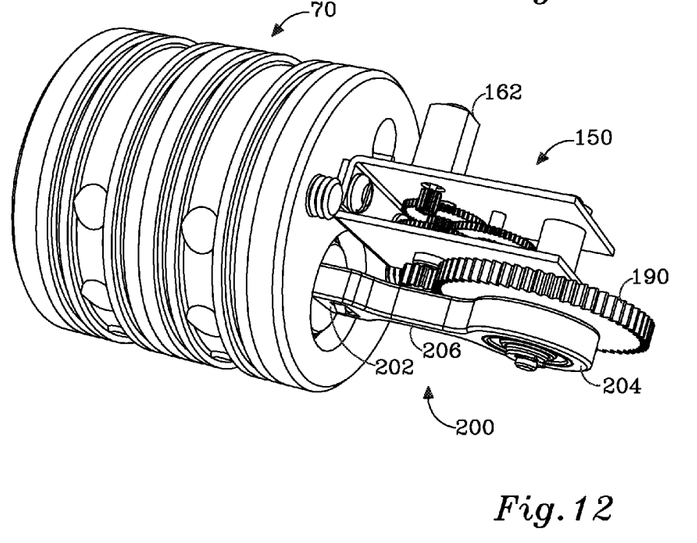
FIG. 12 illustrates an isometric view of the assembled frictionless, pressure balanced proportioning valve, and drive unit of FIG. 11, showing an additional assembly step.

It will be understood that the flexibility of the connecting rod thin bendable portion 206, is useful for compensation of out of axis displacement of the circular eccentric extension 192, during rotation. It will be understood as well, that the above described drive means imposes very low friction forces, yet it is very stiff, free of backlash, efficient and accurate in operation. As a result, a miniature low power motor in the range of 0.1 W is sufficient for long term operation of the assembly.

In operation, the eccentricity of the eccentric extension 192 is so calculated that approximately third revolution (120 degrees) of the final drive gear 190, is sufficient to linearly displace the entire stroke of spool 100. When the spool 100 reaches end of stroke, the motor 162, is mechanically stalled, due to its low power, causing no damage to the gear train components. Momentary higher current consumption of the motor 162 at the end of stroke, may be recognized by an electronic circuit in order to cease motor power until reverse rotation is required by the control circuit. For ease of understanding, final drive gear 190 is shown as full circle gear, however, a sector gear of about 150 degrees will generate the entire stroke of spool 100.

It will be understood that the flexible connecting rod 200, may accept any shape and be mounted to the spool 100 and rotateably mounted to the eccentric extension 192, in many different ways. It will be understood as well, that any other drive means, such as: gear and lever, lead screw, rack and pinion, coiled tensioned piano wire or flexible flat strip, may be used in conjunction with one or more embodiments of the present invention, without departing from the scope of the invention.

Figure 14:
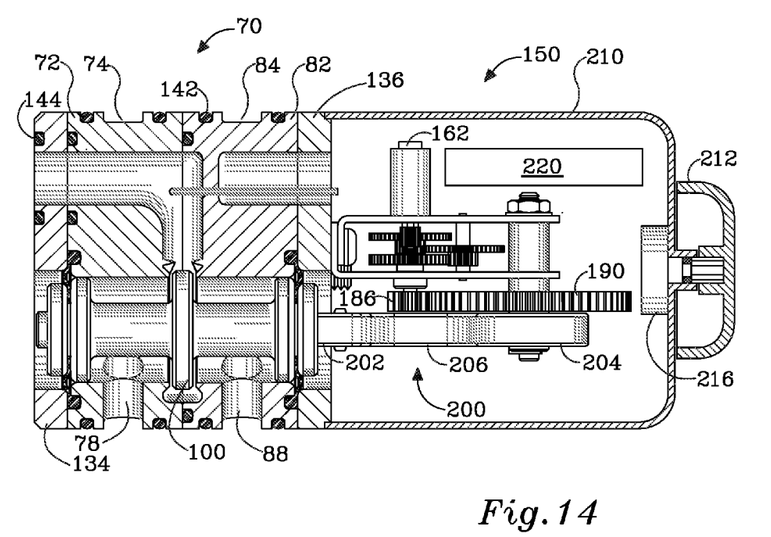
FIG. 14 illustrates a cross-sectional view of the frictionless, pressure balanced proportioning valve, with drive unit and protective cover, taken along line C-C (FIG. 13)

The drive unit 150, may be sealed with a protective cover 210 (FIGS. 13, 14), shown with a dial rotating knob 212, on its top, for manual temperature setting. The dial rotating knob 212, is fitted to the shaft 214 of a swivel potentiometer 216, the shaft 214 is sealed by shaft-seal 218. The potentiometer 216, is used for electronic adjustment of the outlet water temperature as will be explained hereinafter with reference to the electronic circuit (FIG. 20), outlined here and referenced 220 (FIG. 14). It will be understood, however, that any other temperature setting means may be used, including for example, arrowed touch buttons with display unit.

The frictionless, pressure balanced proportioning valve 70, assembled with the sealed drive unit 150, in conjunction with the four external elastomer seals 142, and face seal 144 (FIG. 14), separating between hot, cold, and dry regions, may by readily mounted as a replaceable cartridge in an appropriate housing. Such housing and cartridge positioning, are known to the person skilled in the art, hence will not be explained in detail.

Figure 15:
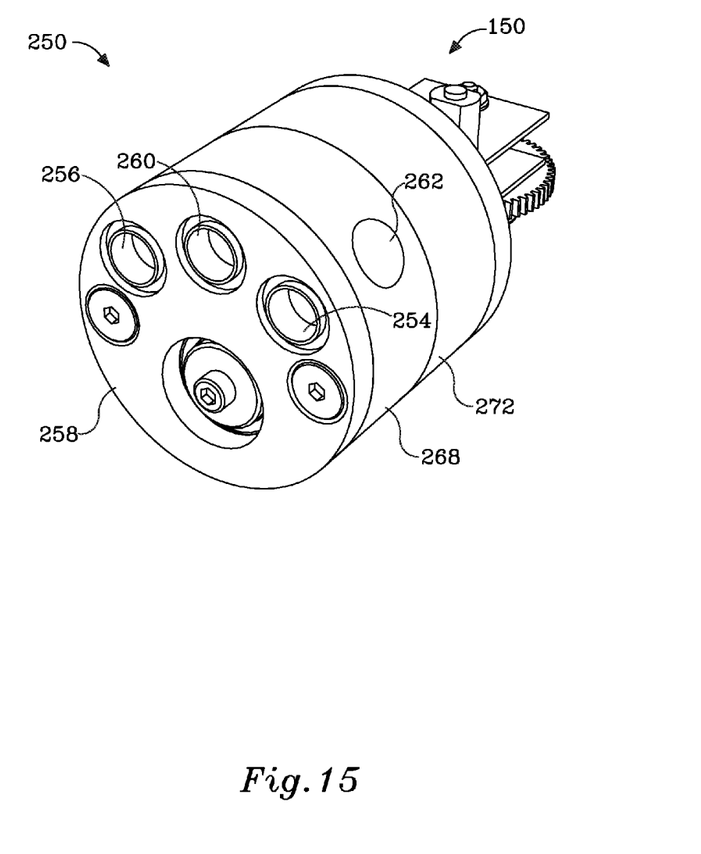
FIG. 15 illustrates an isometric first end view of a frictionless, pressure balanced proportioning valve, in accordance with a third embodiment of the present invention.

As disclosed above, and already demonstrated in the preceding paragraphs, it is an object of the present invention to provide the frictionless proportioning valve assembly and the drive means, as a compact replaceable cartridge. In order that such cartridge may fit into the traditional single handed mixing faucets housings, and possibly adopt the common ceramic disk mechanism for simultaneous volume control of both inlets, a third embodiment of the present invention, is disclosed and explained in detail with reference to FIGS. 15 to 17.

Figure 16:
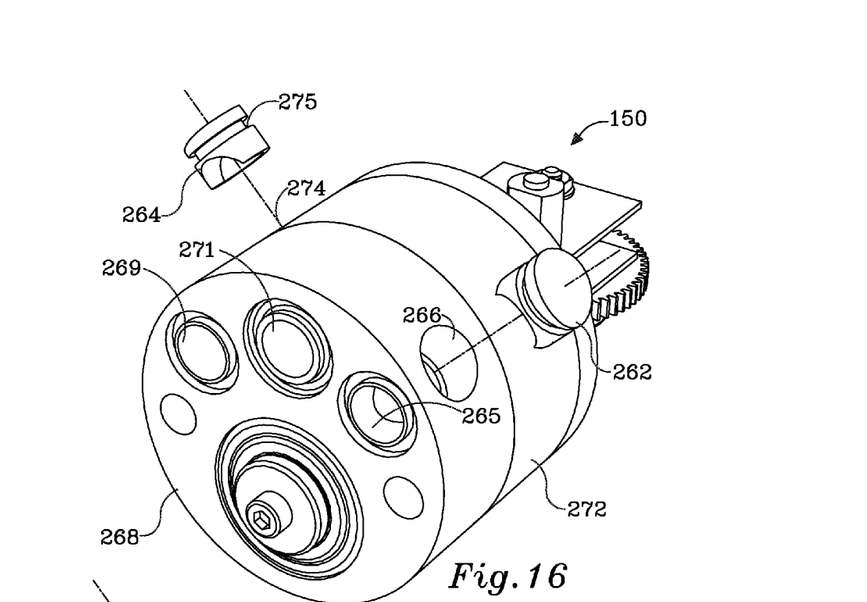
FIG. 16 illustrates the frictionless, pressure balanced proportioning valve of FIG. 15, partially dismantled.
Figure 17:
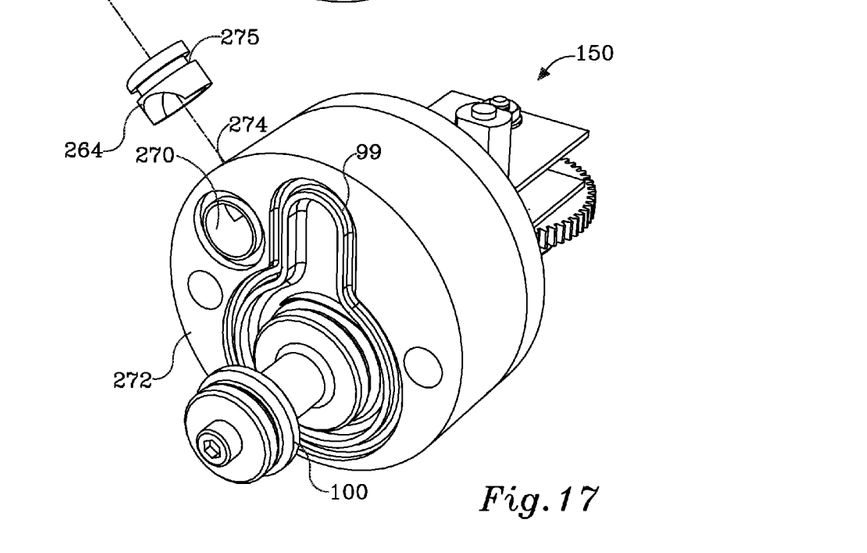
FIG. 17 illustrates the frictionless, pressure balanced proportioning valve of FIG. 16, further dismantled.

Referring to the figures, there is shown a frictionless, pressure balanced proportioning valve assembly, generally referenced 250, basically similar to the assembly 70 of the second preferred embodiment, yet, instead of the outer circumferential recesses 74, 84 (FIGS. 3, 4), serving as inlets of the second embodiment, here, the first and second inlets 254, 256, respectively (FIG. 15), are facially located on the first end disk 258 with same outlet 260 there between. The construction will be better understood when the end disk 258 is removed, as shown in FIG. 16, with plugs 262, 264 displaced for clarity. The first axially oriented inlet 265 is directed to a radial passage 266 of the first cylindrical enclosure 268, being in flow communication with a first non-centric bore (116 in FIG. 4). The second axially oriented inlet 269 is passing through the first cylindrical enclosure 268, into succeeding axially oriented inlet 270 of the second tubular enclosure 272, shown in FIG. 17, with the first tubular enclosure 268, removed. The succeeding inlet 270 is directed to a radial passage 274 of the second cylindrical enclosure 272, being in flow communication with the second non-centric bore (118 in FIG. 4). The plugs 262, 264, are required for sealing of the externally accessed radial bores 266, 274, made open for production simplicity. The plugs 262, 264, sealed with elastomer seals fitted to circumferential grooves 275, are locked upon insertion of the assembled cartridge into appropriate housing. Elastomer seals are seated in a groove around the succeeding inlet 270 of the second tubular enclosure 272, and in grooves around inlets 265, 269, and outlet 271 of the first cylindrical enclosure 268, for internal sealing. Elastomer seals are seated in grooves around inlets 254, 256 and outlet 260 of the first end disk 258, for separating between the hot, cold, mixed and dry regions, while the assembly 250 is seated in an appropriate housing, preferably equipped with ceramic disk valve mechanism (not shown), for simultaneous flow control of both inlets as disclosed above. The remaining details of the third embodiment are identical to the second embodiment including the drive unit 150, seal groove 99 and spool 100.

Two important goals are achieved by using ceramic disk mechanism for simultaneous volume control of both inlets. The first is, elimination of the one way check valves commonly found in mixing faucets inlets, wherein the outlet is controlled, and the second relates to extending the life of the elastic diaphragm seals 120, 122, which will face pressure only while the valve is in use, meaning that most of the time the diaphragms are at rest.

As mentioned above, it is an object of the present invention to provide the frictionless, pressure balanced proportioning valve assembly and drive unit, with an option of self powering the drive means. Accordingly, a fourth embodiment of the present invention, is disclosed and explained in detail with reference to FIGS. 18 to 20. Referring to the figures, there is shown a frictionless, pressure balanced proportioning valve assembly, generally referenced 300, basically similar to the assembly 70 of the second embodiment, or assembly 250 of the third embodiment, with an addition of an axial turbine 302, disposed in the outlet pathway 304 within first tubular enclosure 315. The turbine 302 is mounted on shaft 306 preferably made of non corrosive hard material such as Tungsten Carbide (TC) or chrome plated stainless steel. The Shaft 306 is rotateably seated in first and second bearings 310, 312, respectively, preferably sapphire or ceramic bearings, such as known for instance from the clock industry. Such combination of TC shaft and sapphire or ceramic bearings, may use water as lubricant.

Figure 19:
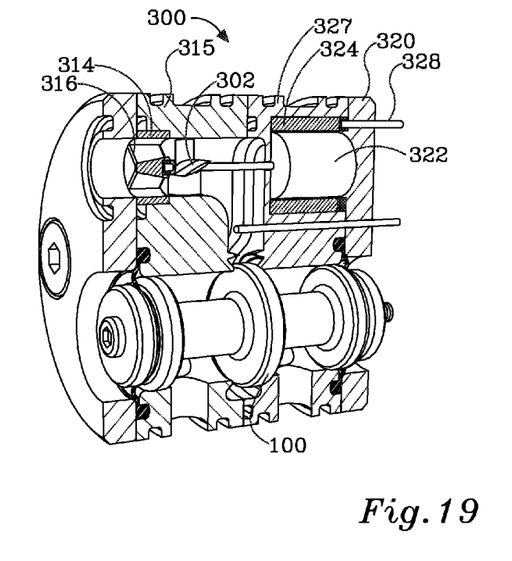
FIG. 19 illustrates a cross sectional isometric view of the frictionless, pressure balanced proportioning valve shown in FIG. 18.
Figure 20:
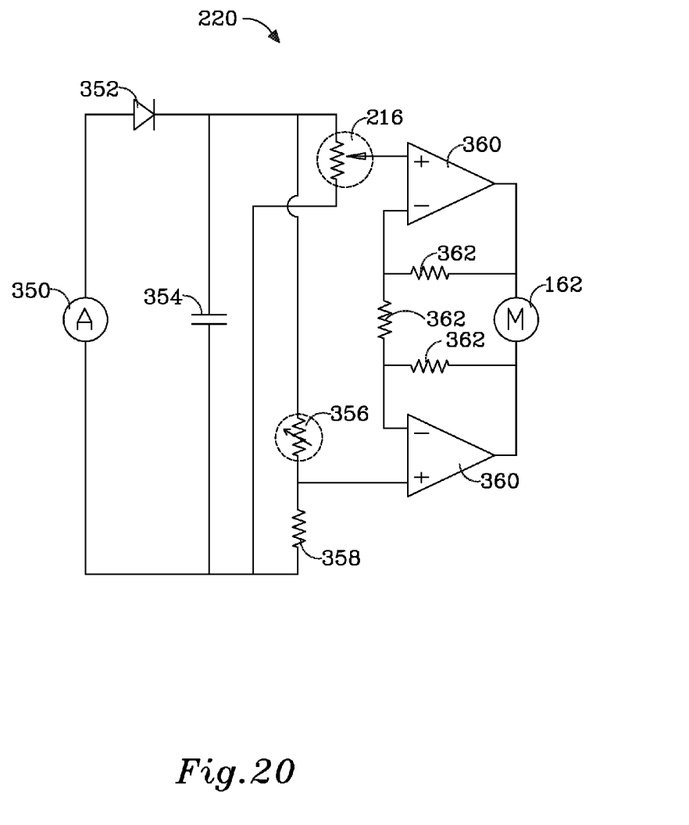
FIG. 20 illustrates a schematic electronic circuit, operative in accordance with several embodiments of the present invention.

First bearing 310 is mounted in the center of a fixed insert 314, seated in the outlet path 304 of the first cylindrical enclosure 315, constructed with radial fins 316 (FIG. 19), to allow free flow of water between the fins. The second bearing 312 is mounted in the second end disk 320. A permanent magnet rotor 322 is mounted on the distal potion of shaft 306, surrounded with preferably plastic impregnated, sealed, stator coil 324, seated in a cylindrical space 325 provided in the second cylindrical enclosure 327. The assembly of rotor 322 and stator coil 324 forms an AC generator also known as alternator 350 (FIG. 20). The space between the rotor 322 and stator coil 324 is filled with water or trapped air, the entire volume, is water tight sealed, with elastomer seal 326. Generated power is delivered to an electronic circuit 220 (FIG. 20), through sealed wires 328.

Figure 18:
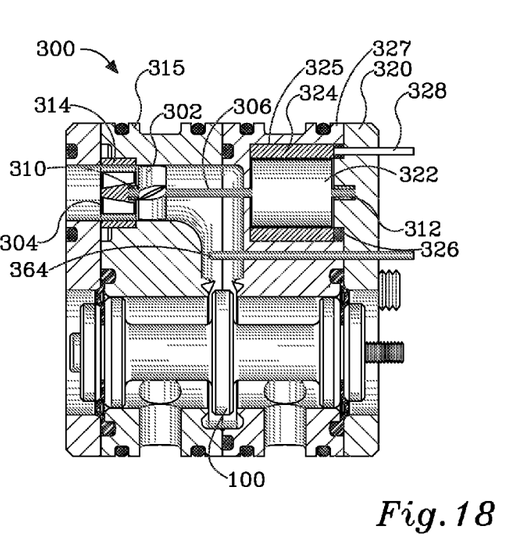
FIG. 18 illustrates a cross-sectional view of a frictionless, pressure balanced proportioning valve, in accordance with a fourth embodiment of the present invention.

Such turbine construction is roughly a small scale of the known Kaplan turbine, the turbine blade geometry may define the speed, extractable power, and water pressure loss. The method of calculation of the above parameters are known to the person skilled in the turbine art.

A simplified electronic circuit generally referenced 220 shown schematically in FIG. 20, and outlined in FIG. 14, may be positioned in the free space under the protective cover 210 of the drive unit 150, and perform permanently to drive the frictionless proportioning valve using power generated by the turbine 302 while the valve is in use. There is no need for a rechargeable battery, since sufficient power is generated instantly when flow is permitted.

Briefly, the simplified entirely analog circuit, contains alternator 350, rectifying diode 352 and smoothing capacitor 354, potentiometer 216 for adjustment of the desired outlet temperature, forming with the thermistor 356 and fixed resistor 358 a Winston bridge. The Winston bridge is measured by the non-inverting inlets of a simplified instrumentation amplifier, demonstrated here with dual operational amplifier 360, and amplification setting resistors 362. The dual operational amplifier 360 is rated to directly drive the low power drive motor 162, preferably having an internal current limiting circuit to avoid motor heating if end of stroke is reached. The thermistor 356 is located in the temperature sensor tip 364 (FIG. 18), exposed to the mixed water pathway.

The operation of this simple, low power consuming, analog circuit will be clear to the person skilled in the electronics art. It will be understood, however, that same circuit 220 may be used in conjunction with the first, second, third or any other embodiment of the present invention, by omitting the alternator 350, and replacing it with an internal disposable or rechargeable power source such as battery, rechargeable battery, or by an external power supply.

As disclosed above it is the low volume of the mixing chamber and the minimal power requirements, that permit stable and fast operation of such simple analog circuit, without any computational capabilities. It will be understood however that any other analog or digital circuits may be used in conjunction with the frictionless pressure balanced proportioning valve and drive means.

It will be appreciated by persons skilled in the art that, while the details disclosed hereinabove relate generally to water flow, the mixing valves disclosed in accordance with the various embodiments of the present invention are not limited to mixing of water but are usable for the mixing of a wide variety of fluids having different and variable temperatures and pressures to provide a substantially stable preselected mixed fluid temperature.

It will further be appreciated by persons skilled in the art that the scope of the present invention is not limited by what has been specifically shown and described hereinabove merely by way of example. Rather, the scope of the present invention is defined solely by the claims, which follow.

The invention claimed is:

1. A frictionless, pressure-balanced proportioning valve assembly for low-power, electrically-operated, thermostatic mixing valves, comprising:
   a. a housing having a first water inlet, a second water inlet, an intermediate mixed-water outlet, a spool bore formed in said housing, being in flow communication with said first and second water inlets, said spool bore having a generally central, widened portion being in flow communication with said intermediate mixed-water outlet;
   b. a spool, having first and second widened end-portions and a central, widened disk portion, wherein said spool is guided in said spool bore, by said first and second widened end-portions, said central, widened disk portion having a narrower axial width than said spool bore central, widened portion, said spool being loosely axially movable within said spool bore with said central, widened disk portion traveling in said spool bore central, widened portion between two opposing seats, thereby defining a peripheral flow gap between said central, widened disk portion and said seats, wherein said central, widened disk portion separates said spool bore into a first tubular water inlet chamber and a second tubular water inlet chamber;
   c. first and second elastic diaphragm seals each one respectively disposed at each end of said spool and said housing, so as to seal said spool against said housing, said elastic diaphragm seals being configured by effective area equalization, for pressure balancing of said first tubular water inlet chamber between said first elastic diaphragm seal and said disk portion, and pressure balancing of said second tubular water inlet chamber between said second elastic diaphragm seal and said disk portion;
   d. a temperature sensor exposed to a mixed-water outlet pathway, for generating an electronic signal readable by an electronic circuit and in relation to the temperature of water in said mixed-water outlet pathway; and
   e. an attached drive means, energized by a low-power electric motor, coupled with said spool so as to cause axial displacement of said spool in accordance with said electronic signal,
   wherein said axial displacement of said spool proportionally mixes flow from said first and second water inlets into said intermediate mixed-water outlet.

2. The assembly as claimed in claim 1, wherein said housing is split into a first cylindrical enclosure having a first, axial, non-centric bore and a second cylindrical enclosure, having a second, axial, non-centric bore,
   wherein said first and second cylindrical enclosures are facially mated with each other, being aligned such that said first and second, axial, non-centric bores are joined to said spool bore, said first and second cylindrical enclosures comprising an internal widened portion forming, when facially mated, a common, minimal-volume mixing chamber, said mixing chamber having an outflow discharged through a radial extension, forming a flow communication path between said mixing chamber and said mixed-water outlet pathway comprising an axially oriented mixed-water outlet pathway formed in said first cylindrical enclosure,
   wherein said minimal-volume mixing chamber defines said central, widened portion.

3. The assembly as claimed in claim 2, wherein said first cylindrical enclosure comprises an outer circumferential recessed, first water inlet in flow communication with said first, axial, non-centric bore by a first, at least one, radial passage and said second cylindrical enclosure comprises an outer circumferential recessed, second water inlet in flow communication with said second, axial, non-centric bore by a second, at least one, radial passage.

4. The assembly as claimed in claim 2, wherein said first cylindrical enclosure is provided with a first, facial, axially oriented inlet directed to a first radial passage, being in flow communication with said first, axial, non-centric bore and a second, facial, axially oriented inlet passing through said first cylindrical enclosure into a succeeding axially oriented inlet of said second cylindrical enclosure, said succeeding axially oriented inlet being directed towards a second radial passage in flow communication with said second, axial, non-centric bore.

5. The assembly as claimed in claim 1, wherein said first and second elastic diaphragm seals, are constructed with an inner ring, an outer ring and a thin, rolling-type active portion.

6. The assembly as claimed in claim 5, wherein said elastic diaphragm seal rings are secured in grooves on the outer faces of said spool, and said housing, tightened to said spool by washers, a center bolt and a nut, and tightened to said housing by fastened end disks.

7. The assembly as claimed in claim 1, wherein said elastic diaphragm seals are constructed as thin-walled metal bellows.

8. The assembly as claimed in claim 2, wherein, said spool is guided in said first and second, axial, non-centric bores, by said first and second widened end portions, said spool carrying said central, widened disk portion comprising a central, widened, two-sided disk portion, each side of said central widened, two-sided disk portion forming a face, said two-sided disk portion being cross-sectionally wider than said first and second non-centric bores, said spool being loosely axially movable between two extreme positions identified by either face of said two-sided disk portion closing against one of opposing first and second valve seats trimming said first and second, axial non-centric bores.

9. The assembly as claimed in claim 2, wherein said minimal-volume mixing chamber is formed with a dedicated contour which is not concentrically aligned with said axial, non-centric bores, having a larger volume directed towards said radial extension, said dedicated contour being optimized such that, at a given flow rate, the circumferential flow velocity of water towards said radial extension is approximately constant.

10. The assembly as claimed in claim 2, wherein said second cylindrical enclosure is provided with an elastomeric seal seated in a groove surrounding said widened portion and said radial extension,
wherein, upon facial mating between said respective faces of said first and second cylindrical enclosures, mixed water is discharged only through said mixed-water outlet pathway and not between said respective faces.

11. The assembly as claimed in claim 2, wherein flow deflectors are provided in said radial extension in order to improve the mixing of hot and cold water prior to temperature measurement taken by said temperature sensor.

12. The assembly as claimed in claim 2, wherein four peripheral elastomer seals and one face elastomer seal separate between said first inlet, said second inlet, said intermediate mixed-water outlet, and dry regions, while said frictionless, pressure balanced proportioning valve assembly is serving as a thermostatic cartridge in an appropriate housing.

13. The assembly as claimed in claim 4, wherein elastomeric seals seated in grooves around said first inlet, said second inlet, said intermediate mixed-water outlet, and said succeeding inlet separate hot, cold, mixed and dry regions, while said frictionless, pressure-balanced proportioning valve assembly serves as a thermostatic cartridge when set in an appropriate housing.

14. The assembly as claimed in claim 4, wherein a ceramic disk mechanism is used for simultaneous volume control of said first and second axially oriented inlets.

15. The assembly as claimed in claim 2, wherein said first and second cylindrical enclosures and said spool are made of plastic material.

16. The assembly as claimed in claim 1, wherein said drive means is chosen from at least one in the group comprising: gear and lever, lead screw, rack and pinion, coiled tensioned piano wire, and flexible flat strip.

17. The assembly as claimed in claim 1, wherein said low-power electric motor has a pinion fixed to a shaft, and
wherein said drive means, powered by said electric motor, further comprises:
a reduction gear train in engagement with said pinion;
a final drive gear, carrying a smaller, circular, eccentric extension, said final drive gear being centrally bored with close tolerances;
a precise diameter fixed pivot with minimal radial clearance such that said final drive gear freely rotates on said fixed pivot; and
a connecting rod, having a first attachable end, a circular end—bored to fit said eccentric extension, and an intermediate, thin, bendable portion to compensate for out-of-axis displacement of said circular eccentric extension during rotation,
wherein said connecting rod is fitted with said circular end disposed over said circular eccentric extension, and secured with said first attachable end to said spool, such that, during rotation, angular displacement of said final drive gear and said circular eccentric extension is translated into linear displacement of said connecting rod and spool.

18. The assembly as claimed in claim 17, wherein a ball bearing is pressed over said circular eccentric extension, and said circular end of said connecting rod is externally fitted to said bearing.

19. The assembly as claimed in claim 17, wherein said connecting rod is made of glass-reinforced plastic.

20. The assembly as claimed in claim 17, wherein said reduction gear train is a three-stage spur wheel gear.

21. The assembly as claimed in claim 17, wherein the eccentricity of said eccentric extension permits an approximately third revolution of said final drive gear, to sufficiently and linearly displace the entire stroke of said spool, said final drive gear being at least one selected from the pair of a full gear and a sector gear.

22. The assembly as claimed in claim 1, wherein said electric motor, being of low power, is mechanically stalled as said spool reaches an end-of-stroke stage, causing no damage to components of said drive means.

23. The assembly as claimed in claim 22, wherein said end-of-stroke stage produces a momentary higher current consumption of said electric motor recognized by said electronic circuit in order to cease motor power until reverse rotation is required.

24. The assembly as claimed in claim 1, wherein said drive means is sealed with a protective cover, comprising a manual temperature-setting means fitted to a top portion of said protective cover, said temperature-setting means being chosen from at least one of a sealed-dial rotating knob and arrow touch buttons configured in a display unit.

25. The assembly as claimed in claim 4, wherein an axial turbine is disposed in said axially oriented outlet pathway, mounted on a shaft rotatably seated in first and second bearings, said first bearing is mounted in a center of a fixed insert constructed with radial fins to allow free flow of water between the fins, said second bearing mounted in a second end disk, a permanent-magnet rotor is mounted on a distal portion of said shaft, surrounded with a stator coil, seated in a cylindrical space provided in said second cylindrical enclosure, wherein the assembly of a rotor and said stator coil forms an AC generator, wherein the entire volume of the cylindrical space is watertight sealed, and wherein generated power is delivered to an electronic circuit.

26. The assembly as claimed in claim 24, wherein said protective cover has said electronic circuit disposed in free space under said protective cover, said electronic circuit delivering power to drive said frictionless, proportioning valve drive means using a power source selected from a group comprising, an internal disposable battery, an internal rechargeable battery, an internal turbine-generated power source, and an external power source.

27. The assembly as claimed in claim 26, wherein said electronic circuit comprises at least, an adjustment potentiometer, forming with a thermistor sensor and a fixed resistor, a Winston bridge, a voltage of said Winston bridge being measured by non-inverting inlets of an instrumentation amplifier composed of a dual-operational amplifier and amplification-setting resistors, said dual-operational amplifier being rated to directly drive said low-power drive motor.

* * * * *